United States Patent [19]

Nomura et al.

[11] Patent Number: 5,095,630
[45] Date of Patent: Mar. 17, 1992

[54] ELECTRONIC MAGNETIC COMPASS

[75] Inventors: Goro Nomura; Masami Tanaka; Yusaku Satsukawa; Kenji Yamada; Kenji Kogure, all of Kanagawa, Japan

[73] Assignee: Tokimec Inc., Tokyo, Japan

[21] Appl. No.: 626,945

[22] Filed: Dec. 13, 1990

[30] Foreign Application Priority Data

Dec. 27, 1989 [JP] Japan .................. 1-339786

[51] Int. Cl.$^5$ .................................. G01C 17/30
[52] U.S. Cl. ..........................: 33/356; 33/361; 33/363 K
[58] Field of Search ............. 33/361, 356, 357, 355 R, 33/363 K

[56] References Cited

U.S. PATENT DOCUMENTS 4,418,480 12/1983 Garner ........................ 33/356 X
4,862,398 8/1989 Shimizu et al. ............... 33/356 X Primary Examiner—Harry N. Haroian
Attorney, Agent, or Firm—Ladas & Parry

[57] ABSTRACT

Disclosed is an electronic magnetic compass which is to be mounted on a small ship and which is reduced in cost and improved in performance. The electronic magnetic compass is provided with an angle sensor interlocked with a compass card so as to produce a code signal at every predetermined angle, a code converter for converting the code signal into a compass indication angle, and a signal conversion circuit for producing a deviation signal indicating a deviation between an azimuth angle signal and an indication angle signal. The compass azimuth measurement is performed with a simple configuration of an open loop system, so that the structure of an encoder for the angle sensor is so simple that the cost can be reduced so much. The azimuth angle signal and the indication angle signal can be automatically calibrated so that the measurement accuracy can be improved.

4 Claims, 3 Drawing Sheets

ELECTRONIC MAGNETIC COMPASS

BACKGROUND OF THE INVENTION

1. Field of the Invention

The present invention relates to an electronic magnetic compass which is mounted, for example, on a small ship and which is responsive to the terrestrial magnetism to thereby indicate the azimuth of the ship, and particularly relates to an improvement in cost and performance of the appliance.

2. Description of the Related Art

An electronic magnetic compass responsive to the terrestrial magnetism is used to indicate the course, that is, the azimuth of the bow of a small ship, specifically, such as a pleasure boat.

FIG. 4 is a block diagram showing an example of the conventional electronic magnetic compass. In FIG. 4, the electronic magnetic compass comprises a sensor section 1 for producing an azimuth signal in response to the terrestrial magnetism, an operation unit 25 for performing signal conversion to indicate the azimuth signal, and an indicator 26.

FIG. 5 is a block diagram showing another conventional electronic magnetic compass. In FIG. 5, the electronic magnetic compass comprises a sensor section 1 which is the same as that in the above conventional electronic magnetic compass of FIG. 4, a deceleration mechanism 7, a compass card 8 provided with a scale given over the whole azimuth for indicating a compass direction, an operation section 27 for producing a deviation signal indicating a deviation between an azimuth signal produced from the sensor section 1 and a fedback indication signal, a driving circuit 28 for amplifying the deviation signal, a driving section 29 for driving the compass card 8 to rotate in accordance with the deviation signal, and an angle sensor 30 interlocked with the compass card 8 so as to feed back the indication signal.

In the conventional electronic magnetic compass having such a configuration as described above, the compass card 8 which follows the azimuth signal produced from the sensor section 1 and on which a scale is provided over the whole azimuth for indicating a compass direction is interlocked with the angle sensor 30 which employs a potentiometer, a resolver, an encoder, or the like, for generating the indication signal with accuracy equivalent to that of the scale of the compass card 8 given over the whole azimuth, so that a follow-up circuit forms a closed loop system. The indication signal produced from the angle sensor 30 follows the azimuth signal produced from the sensor section 1 and the operation is performed so as to make the indication signal and the azimuth signal always agree with each other. On the compass card 8, therefore, the azimuth in accordance with the signal produced from the sensor section 1 is always indicated.

In the conventional electronic magnetic compass as described above. In FIG. 4, the azimuth signal produced from the sensor section 1 is transmitted to the indicator 26 through the operation unit 25, and the azimuth measurement is performed in an open loop system. Accordingly, if an error exists between the sensor section 1 and the indicator 26, the error cannot be corrected, so that the accuracy in measurement is lowered.

Further, in the conventional electronic magnetic compass of the closed loop system as shown in FIG. 5, in order to always perform azimuth indication on the basis of the signal of the sensor section 1, it is necessary that the highly accurate angle sensor 30, such as a potentiometer, a resolver, an absolute encoder, or the like, for producing a signal having resolution of the same degree as that of the sensor section 1 is interlock with the compass card 8 so as to form a closed loop to thereby make the indication signal follow the azimuth signal.

In order to make an absolute encoder generate an indication signal, for example, at every degree, it is necessary to provide a digital code of not less than 9 bits (512) and to provide a device for optically reading a digital code. Accordingly, the structure becomes extremely complicated and the cost becomes high.

SUMMARY OF THE INVENTION

It is therefore an object of the present invention to solve the problems in the prior art.

It is another object of the present invention to provide an electronic magnetic compass in which azimuth measurement can be performed with a simple configuration of an open loop system which is low in cost, and in which the compass direction can be automatically calibrated at every predetermined angle so that correct azimuth indication can be always performed.

In order to attain the above objects, according to the present invention, the electronic magnetic compass comprises an angle sensor interlocked with a compass card so as to produce a code signal at every predetermined angle, a code converter for converting the code signal into an indication angle of the compass card correspondingly to the code signal, a signal conversion circuit for producing an azimuth angle signal converted from the azimuth signal produced from the sensor section and producing a deviation signal indicating a deviation between the azimuth angle signal and an indication angle signal fed back at every predetermined angle from the angle sensor through the code converter, and a driving section for driving the compass card.

According to the present invention, the electronic magnetic compass compresses an angle sensor provided with a code given at every predetermined angle correspondingly to an indication angle of a compass card which follows a signal from a sensor section so as to indicate an azimuth, and a signal conversion circuit which generates a signal for driving the compass card and for calibrating the indication angle of the compass card at every predetermined angle. The azimuth measurement of the compass is generally performed through a simple code with an open loop system. That is, an encoder used as the angle sensor interlocked with the compass card is not provided with a whole azimuth scale having the accuracy equivalent to that of the compass card but is provided with a simple code corresponding to the indication angle of the compass card is given at every predetermined angle. Accordingly, the structure of the compass can be made extremely simple and the cost can be reduced.

When the compass card moves by a predetermined angle, a code is produced from the angel sensor, and an indication signal converted from the code is fed back to the signal conversion circuit so that a closed loop is temporarily formed. An azimuth angle signal produced from the sensor section and an indication angle signal produced from the angle sensor are compared with each other. When there is a difference between the azimuth angle signal and the indication angle signal, the compass card is driven in accordance with a deviation signal produced from the signal conversion circuit.

Accordingly, the azimuth indicated by the compass card is automatically calibrated at every predetermined angle, so that the accuracy in measurement can be improved.

DETAILED DESCRIPTION OF PREFERRED EMBODIMENT

Referring to the accompanied drawings, an embodiment of the electronic magnetic compass will be described in detail hereunder.

Figure 1:
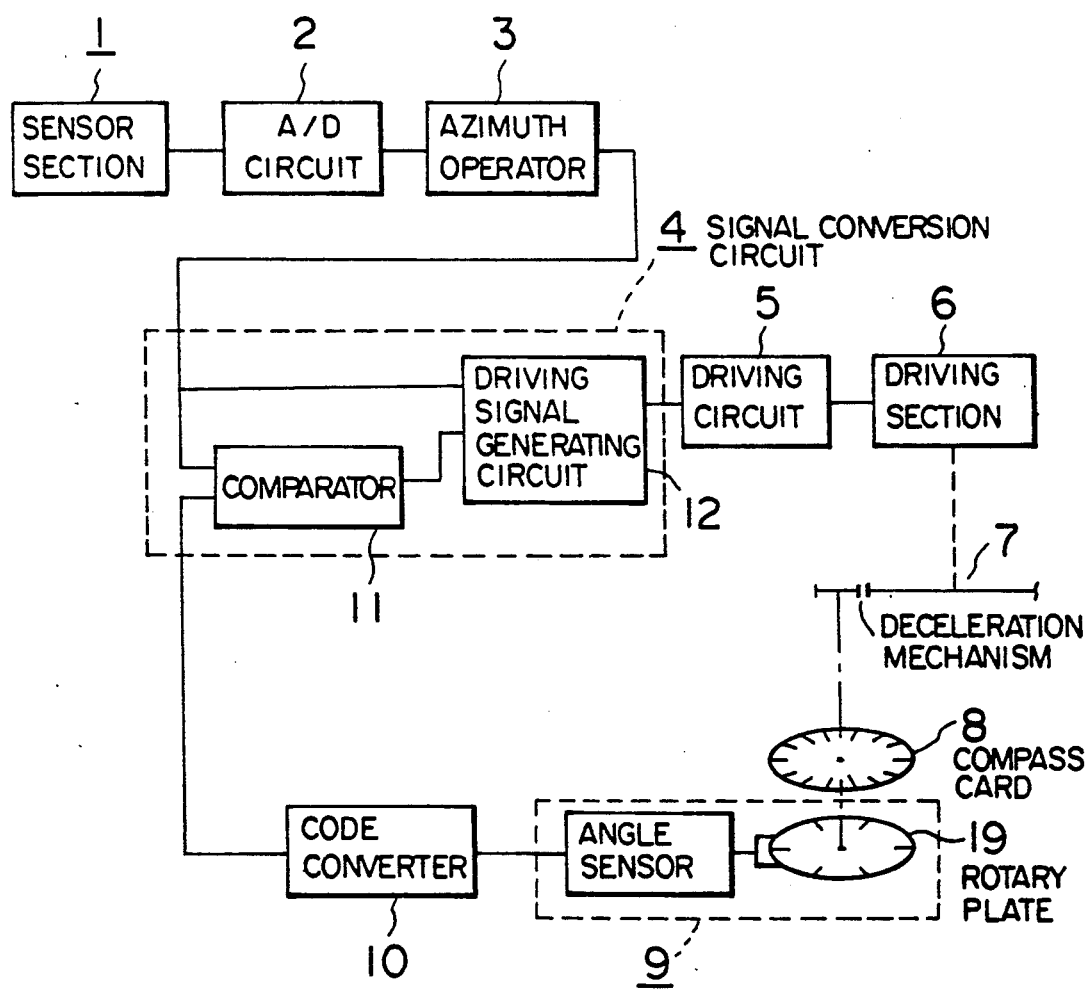
FIG. 1 is a block diagram showing an embodiment of the electronic magnetic compass according to the present invention.

FIG. 1 is a block diagram showing an embodiment of the present invention.

In the drawing, the electronic magnetic compass includes a sensor section 1, a deceleration mechanism 7, and a compass card 8 which are the same as those in the conventional compass. The electronic magnetic compass further includes an A/D circuit 2, an azimuth operator 3 for correcting errors of a deviation and a self-deviation contained in a quantized signal produced from the sensor section 1 so as to produce an azimuth angle signal corresponding to an azimuth angle, a signal conversion circuit 4 for generating a signal for driving the compass card 8 in accordance with the azimuth angle signal produced from the sensor section 1 and for calibration-driving the compass card 8 in accordance with the azimuth angle signal and an indication angle signal, a driving circuit 5 for amplifying a pulse signal produced from the signal conversion circuit 4, a driving section 6 using a pulse motor (that is, a step motor), or the like, for driving the compass card 8 to rotate, an angle sensor 9 interlocked with the compass card 8 so as to generate a code related to an indication angle of the compass card 8, a code converter 10 for converting the code supplied from the angle sensor 9 into an indication angle signal corresponding to the indication angle of the compass card 8, a comparator 11 for comparing the azimuth angle signal and the indication angle signal to produce a deviation signal, and a driving-signal generating circuit 12 for generating a pulse signal for driving the driving section 6 in the forward or reverse direction in accordance with an increase or a decrease of the azimuth angle and in accordance with the polarity of the deviation signal from the comparator 11.

In the electronic magnetic compass having such a configuration as described above, as the sensor section 1 for detecting an azimuth of the bow, for example, a magnetic sensor which is responsive to the terrestrial magnetism to thereby produce a signal indicating the azimuth thereof is mounted on a portion where interference from the magnetism of the body of the ship made of a magnetic or non-magnetic material can be prevented.

Figure 2:
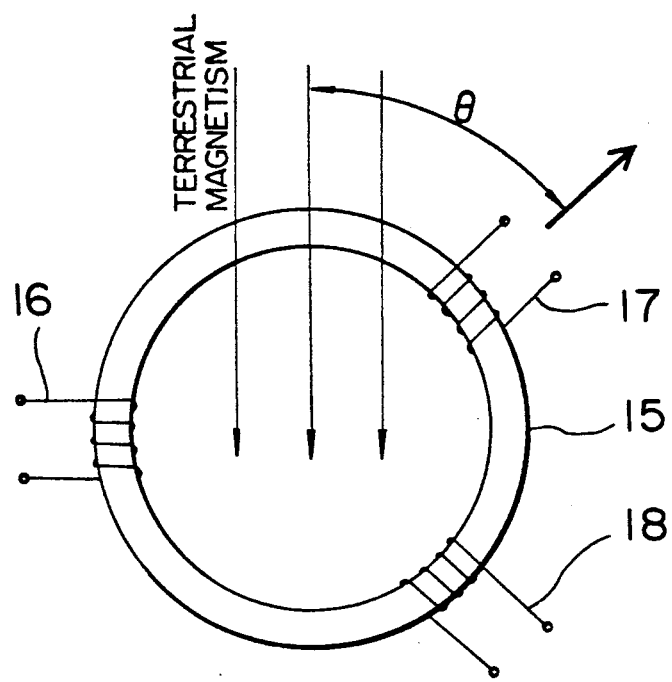
FIG. 2 is a theoretical view showing an embodiment of the sensor section.

FIG. 2 is a theoretical view showing an embodiment of the sensor section 1. A magnetic sensor used in the sensor section 1 for detecting the terrestrial magnetism includes a ring-like core 15 made of a magnetic material having low magnetic reluctance and a sharp saturable characteristic, an exciting coil 16 wound around the core 15 for performing AC excitation, and first and second detection coils 17 and 18 wound around the core 15 at the secondary side thereof the second detection coil 18 being arranged perpendicularly to the first detection coil 17.

When an AC signal is applied to the exciting coil 16 of the magnetic sensor having a flux gate coil formed therein, the exciting coil 16 is excited so that the magnetic reluctance of the core 15 changes periodically and the number of lines of the terrestrial magnetism magnetic force similarly changes. Accordingly, voltages, $KCos\ \theta$ and $KSin\ \theta$, having a frequency twice as high as that of the exciting signal and corresponding to the number of lines of the magnetic force are induced in the first and second detection coils 17 and 18 wound on one and the same core 15 at the secondary side thereof, $\theta$ being the coming direction of the lines of the magnetic force into the ship.

The equivalent operation can be carried out in the case where a magnetic sensing element (a Hall element) is used in the sensor section 1.

An output of the sensor section 1 is quantized into a digital signal by the A/D circuit 2. The azimuth operator 3 takes in the quantized $Sin\ \theta$ and $Cos\ \theta$ at predetermined time intervals, and calculates the azimuth $\theta$ of the bow, so that in order to correct the deviation between the true meridian and the magnetic meridian which is caused by the condition under which the compass is mounted on the ship, the azimuth operator 3 performs the deviation correction on the basis of a preset value and the self-deviation correction to correct the azimuth on the basis of a preset correction value of magnetic field disturbed by the magnetism of the ship. Thus, an azimuth angle signal showing the corrected azimuth of the bow is produced from the azimuth operator 3. The driving-signal generating circuit 12 of the signal conversion circuit 4 supplied with this azimuth angle signal generates a control signal for rotating a drive motor, for example, a pulse motor provided in the driving section 6 in the forward or reverse direction so as to give a predetermined rotation to the compass card 8 through the deceleration mechanism 7 to thereby make the compass card 8 follow the azimuth signal.

Prior start of measurement by the electronic magnetic compass, the position of the compass card 8 indicating the azimuth angle is calibrated automatically. That is, when the pulse motor provided in the driving section 6 is controlled so as to rotate the compass card 8 in the predetermined direction, a code signal is produced from the angle sensor 9.

Figure 3:
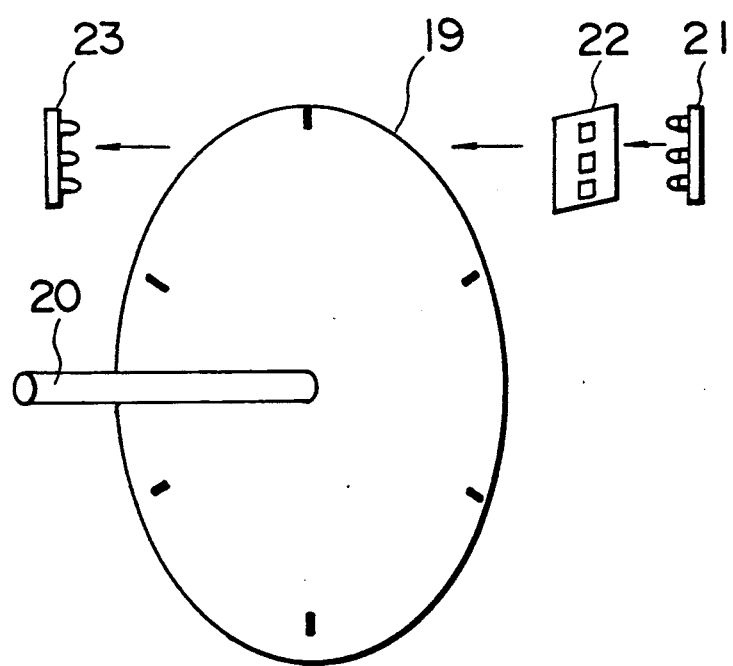
FIG. 3 is an explanatory view showing an example of an angle sensor.
Figure 4:
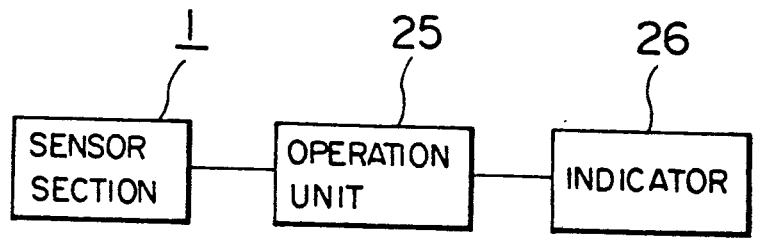
FIG. 4 is a block diagram showing a conventional electronic magnetic compass.
Figure 5:
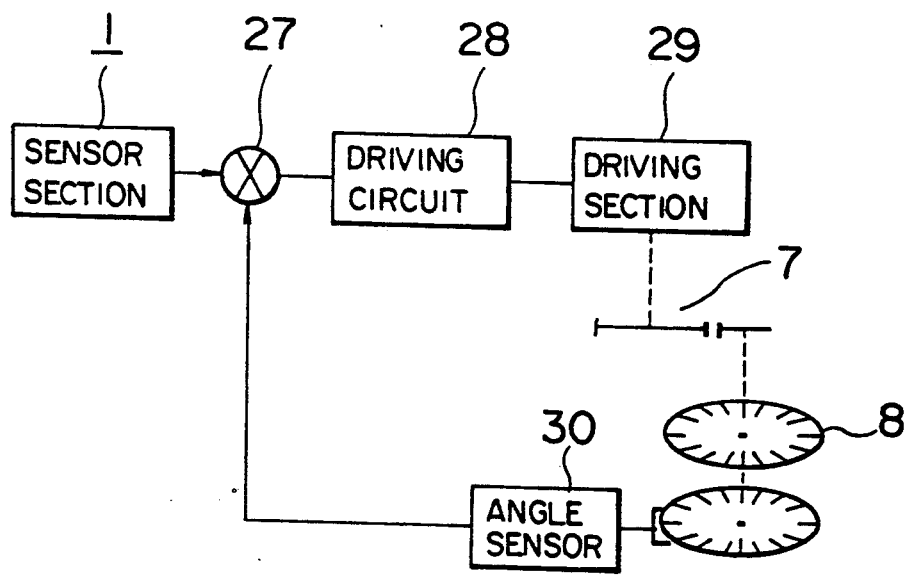
FIG. 5 is a block diagram showing another conventional electronic magnetic compass.

FIG. 3 is an explanatory view showing an example of the angel sensor. In the angle sensor 9 using an optical encoder includes a rotary plate 19 having slits of simple codes each formed at every predetermined angle corresponding to the azimuth angle of the compass card 8, for example, at every angel obtained by equally or desiredly dividing the whole azimuth into several divisions (for example, at every 60° in the 3-bit code system), a shaft 20 for driving the rotary plate 19 interlocked with the compass card 8, light emission diodes 21, a slit plate 22, and phototransistors 23 provided in opposition to the light emission diodes 21 and the slit plate 22 through the rotary plate 19.

The phototransistors 23 are arranged so as to correspond to the respective slits showing the bits of the rotary plate 19 and therefore each phototransistor 23 produces an individually read-out code. Accordingly, the code produced from the angle sensor 9 corresponds to the indication angle of the compass card 8 interlocked with the angle sensor 9.

Further, even in the case where only slit is provided in the rotary plate 19 over the whole azimuth, the equivalent operation can be carried out.

Assuming that the stepping angle of the pulse motor is set, for example, to 7.5°/step, and that the speed of the pulse motor is decelerated by 1/15 by the deceleration mechanism 7, then the compass card 8 is rotated by 0.5°/step.

The azimuth signal produced from the sensor section 1 is made to be an azimuth angle signal in which the deviation and self-deviation have been corrected. The signal produced from the driving-signal generating circuit 12 of the signal conversion circuit 4 gives predetermined rotational drive to the pulse motor provided in the driving section 6 through the driving circuit 5 so as to make the compass card 8 indicate the azimuth.

When the compass card 8 rotates by a predetermined angle, the indication angle of the compass card 8 is detected by the corresponding code of the angle sensor 9 interlocked with the compass card 8, the detected code is converted into the indication angle signal by the code converter 10, and the indication angle signal is fed back to the comparator 11 so as to be compared with the azimuth angle signal so that the next deviation signal is produced from the comparator 11 as follows.

That is:

(1) When (azimuth angle signal - indication angle signal)>0, the deviation signal in the form of a positive pulse is produced;

(2) When (azimuth angle signal - indication angle signal)<0, the deviation signal in the form of a negative pulse is produced;

(3) When (azimuth angle signal - indication angle signal=0, no deviation signal is produced.

The deviation signal produced from the comparator 11 is applied to the driving-signal generating circuit 12 to which the azimuth angle signal is separately applied. The output of the driving-signal generating circuit 12 rotates the compass card 8 in the forward or reverse direction in accordance with the polarity and the number of pulses of the deviation signal so as to make the compass card 8 follow the azimuth angle signal. The calibrating operation at that time relates to the indication angle signal fed-back from the angel sensor 9, so that a closed loop is formed so as to automatically perform the calibrating operation.

The compass card 8 correctly follows the direction of the sensor section 1 through the calibrating operation, so that the accuracy of measurement can be improved. When the calibrating operation has been completed and the azimuth of the bow has been changed, the indication of the compass card 8 is performed in accordance with the azimuth angle signal in which the deviation and the self-deviation have been corrected.

When the azimuth signal produced from the sensor section 1 changes by a predetermined angle, the compass card 8 changes by the same angle, so that a code corresponding to the indication angle of the compass card 8 is produced from the angel sensor 9 again.

When, for example, a decoder is used as the code converter 10, the decoder produces an indication angel signal showing the indication angle of the compass card 8 correspondingly to an input of a digital code applied to, for example, an encoder used in the angle sensor 9.

As described above, the operation of the compass card 8 following the azimuth angle signal produced from the sensor section 1 through the driving section 6 is performed in an open loop system, while the automatic calibration on the basis of the indication angle signal and the azimuth angle signal fed back at every predetermined angle from the angle sensor 9 interlinked with the compass card 8 is performed through the follow-up operation in the closed loop system.

The object of the invention can be attained by using simple codes without giving minute codes over the whole azimuth to the above encoder used as the angle sensor 9.

Accordingly, the structure of the angle sensor 9 can be made so simple that the cost can be extremely reduced.

As described above, according to the present invention, the electronic magnetic compass has a simple structure in which there are provided a angle sensor for generating a code at every predetermined angle in response to a compass card following an azimuth angle signal produced from a sensor section, and a signal conversion circuit for generating a deviation signal between the signal produced from the sensor section and the signal fed back from the angle sensor.

Accordingly, the azimuth measurement by the compass is generally performed with a simple configuration of an open loop system.

The encoder used as the angel sensor has a simple structure in which a simple code is given at every predetermined angle, so that the cost can be reduced.

The invention has a further advantage in that the indication angle signal fed back from the angle sensor and the azimuth angle signal produced from the sensor section are compared with each other at every predetermined angle of the compass card so that the indication of the compass card is automatically calibrated, resulting in improvement in accuracy of the measurement.

What is claimed is:

1. An electronic magnetic compass mounted on a ship so that said compass receives an azimuth signal from a sensor section which is responsive to the terrestrial magnetism to produce said azimuth signal, thereby driving a compass card to indicate the azimuth of said ship, said electronic magnetic compass comprising:

an angle sensor interlocked with said compass card so as to produce a code signal at every predetermined angle;

a code converter for converting said code signal into an indication angle of said compass card correspondingly to said code signal;

a signal conversion circuit for producing an azimuth angle signal converted from said azimuth signal produced from said sensor section and producing a deviation signal indicating a deviation between said azimuth angle signal and an indication angle signal fed back at every predetermined angle from said angle sensor through said code converter;

a driving section for driving said compass card; and the indication of said compass card being corrected at every predetermined angle.

2. An electronic magnetic compass according to claim 1, in which said angel sensor includes an absolute encoder for producing a code signal at every predetermined angle.

3. An electronic magnetic compass according to claim 1, in which the whole azimuth is divided into several divisions so that said angle sensor produces a code signal at every angle corresponding to each division.

4. An electronic magnetic compass according to claim 1, in which said driving section includes a pulse motor.

* * * * *